United States Patent [19]
Chatterji et al.

[11] Patent Number: 5,875,845
[45] Date of Patent: Mar. 2, 1999

[54] METHODS AND COMPOSITIONS FOR SEALING PIPE STRINGS IN WELL BORES

[75] Inventors: Jiten Chatterji; David D. Onan, both of Duncan; Roger S. Cromwell, Walters, all of Okla.

[73] Assignee: Halliburton Energy Services, Inc., Duncan, Okla.

[21] Appl. No.: 59,273

[22] Filed: Apr. 13, 1998

Related U.S. Application Data

[63] Continuation-in-part of Ser. No. 914,594, Aug. 18, 1997.

[51] Int. Cl.$^6$ ..................................................... E21B 33/14
[52] U.S. Cl. ........................ 166/293; 166/295; 166/300; 405/264
[58] Field of Search ........................... 166/285, 292–295, 166/300; 405/264

[56] References Cited

U.S. PATENT DOCUMENTS

| | | | |
|---|---|---|---|
| 3,082,823 | 3/1963 | Hower | 166/29 |
| 3,467,208 | 9/1969 | Kelly | 175/72 |
| 3,960,801 | 6/1976 | Cole et al. | 260/33.6 EP |
| 3,976,135 | 8/1976 | Anderson | 166/276 |
| 4,072,194 | 2/1978 | Cole et al. | 166/295 |
| 4,215,001 | 7/1980 | Elphingstone et al. | 252/8.55 C |
| 4,272,384 | 6/1981 | Martin | 252/8.55 R |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles et al. | 166/300 |
| 4,785,884 | 11/1988 | Armbruster | 166/280 |
| 5,159,980 | 11/1992 | Onan et al. | 166/294 |
| 5,168,928 | 12/1992 | Terry et al. | 166/292 |
| 5,293,938 | 3/1994 | Onan et al. | 166/293 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,373,901 | 12/1994 | Norman et al. | 166/300 |
| 5,377,757 | 1/1995 | Ng | 166/277 |
| 5,547,027 | 8/1996 | Chan et al. | 166/295 |

FOREIGN PATENT DOCUMENTS

| | | | |
|---|---|---|---|
| WO 91/02703 | 7/1991 | WIPO | C04B 24/24 |
| WO 94/12445 | 9/1994 | WIPO | C04B 26/18 |

*Primary Examiner*—Roger Schoeppel
*Attorney, Agent, or Firm*—Craig W. Roddy; C. Clark Dougherty, Jr.

[57] ABSTRACT

The present invention provides improved methods and compositions for sealing a pipe string in a well bore. The methods basically include the steps of preparing a hardenable epoxy sealing composition which hardens into a resilient solid mass having high bond strength comprising an epoxide containing liquid, an organosilane compound and a hardening agent, placing the epoxy composition in the annulus between the pipe and the walls of the well bore and allowing the epoxy composition to harden.

23 Claims, No Drawings

METHODS AND COMPOSITIONS FOR SEALING PIPE STRINGS IN WELL BORES

RELATED U.S. APPLICATION DATA

This application is a continuation-in-part of application Ser. No. 08/914,594 filed on Aug. 18, 1997.

BACKGROUND OF THE INVENTION

1. Field of the Invention

The present invention relates generally to improved methods and compositions for sealing pipe strings in well bores, and more particularly, to such methods and compositions wherein the sealant is corrosion resistant, highly resilient and has high bond strength.

2. Description of the Prior Art

Hydraulic cement compositions are commonly utilized as sealants in subterranean well construction and repair procedures. For example, hydraulic cement compositions are used in primary sealing operations whereby strings of pipe such as casing and liners are sealed in well bores. In performing primary cementing, a hydraulic cement composition is pumped into the annular space between the walls of the well bore and the exterior surfaces of pipe disposed therein. The cement composition is permitted to set in the annular space thereby forming an annular sheath of hardened substantially impermeable cement therein. The cement sheath supports and positions the pipe in the well bore and bonds the exterior surfaces of the pipe to the walls of the well bore whereby the undesirable migration of fluids between zones or formations penetrated by the well bore is prevented.

When conventional cement compositions are utilized for sealing pipe strings in well bores, they set into brittle solid masses. Consequently, the solid cement often does not have sufficient resiliency to resist loss of pipe and/or formation bond, cracking or shattering as the result of pipe movements caused by expansion, contraction, impacts or shocks. The bond loss, cracking or shattering of the set cement allows leakage of formation fluids through at least portions of the well bore by way of the annulus therein which can be highly detrimental.

Hardenable epoxy resin compositions have heretofore been used for sealing pipe strings in well bores which penetrate subterranean zones containing corrosive fluids. For example, waste fluids such as salt water, acidic materials, caustic materials, organic materials, chemical by-product materials and the like are often disposed of by injecting them into disposal wells. Such disposal wells penetrate subterranean formations which accept large volumes of waste and are naturally separated from other subterranean formations. When a disposal well or other well where hydrocarbons are produced along with corrosive fluids is completed in the conventional manner whereby a string of steel pipe is cemented in the well bore utilizing a hydraulic cement slurry, both the cement and steel pipe are often subjected to severe corrosion. A result of such corrosion in disposal wells can be that the liquid waste materials leak into and contaminate formations containing useful fluids such as hydrocarbons or potable water. In other wells where hydrocarbons are produced with corrosive fluids, the corrosion can result in leakage of fluids between formations and/or to the surface.

In order to prevent the corrosion of metal pipe strings in disposal and other similar wells, it has heretofore been the practice to seal the pipe strings in well bores with a hardenable epoxy resin composition. Epoxy resin compositions are highly resistant to degradation by acids and other corrosive fluids and their use at least reduces the corrosion of metal pipe strings and the chances that corrosive fluids will find their way to the surface or into other subterranean locations. However, like set cement compositions, hardened epoxy resin compositions have often lacked sufficient resiliency as well as the necessary bond strength to resist failure as a result of pipe movements.

Thus, there are needs for improved methods and compositions for sealing pipe strings in well bores whereby the hardened compositions can withstand the effects of contact with corrosive fluids and also have the resiliency and high bond strength required to withstand pipe movements without failure.

SUMMARY OF THE INVENTION

The present invention provides improved methods and epoxy sealing compositions for sealing a string of pipe in a well bore whereby upon hardening the compositions can withstand the effects of contact with corrosive fluids and pipe movements. The methods basically comprise the steps of preparing a hardenable epoxy sealing composition which hardens into a solid mass having resiliency and high pipe and formation surface bond strengths, placing the epoxy composition into the annulus between the string of pipe and the walls of the well bore and allowing the epoxy composition to harden.

The epoxy compositions of this invention which have high resiliencies and high bond strengths are comprised of an epoxy resin or an epoxide containing liquid, or both, an organosilane compound and at least one hardening agent. The epoxy compositions preferably also include a filler such as crystalline silica or the like.

It is, therefore, a general object of the present invention to provide improved methods and compositions for sealing pipe strings in well bores.

Other and further objects, features and advantages of the present invention will be apparent to those skilled in the art upon a reading of the description of preferred embodiments which follows.

DESCRIPTION OF PREFERRED EMBODIMENTS

The present invention provides improved methods and compositions for sealing pipe strings in well bores whereby the hardened sealing compositions can withstand the effects of contact with corrosive fluids as well as pipe movements due to expansion, contraction, impacts, shocks or the like. In accordance with the methods, an epoxy composition which hardens into a resilient solid mass having high pipe and formation bond strengths is prepared, placed in the annulus between a pipe or pipe string and the walls of a well bore and allowed to harden therein. The sealant compositions which are useful in accordance with the present invention are epoxy compositions basically comprised of an epoxy resin or an epoxide containing liquid, or both, an organosilane compound and at least one hardening agent.

While various epoxy resins can be utilized, preferred such resins are those selected from the condensation products of epichlorohydrin and bisphenol A. A particularly suitable such resin is commercially available from the Shell Chemical Company under the trade designation "EPON®RESIN 828". This epoxy resin has a molecular weight of about 340 and a one gram equivalent of epoxide per about 180 to about 195 grams of resin. When used, the epoxy resin is generally included in an epoxy composition of this invention in an amount in the range of from about 10% to about 90% by weight of the epoxy composition, preferably in an amount of about 50%.

A solvent or a low viscosity epoxide containing liquid or a mixture of such epoxide containing liquids can be utilized to modify the viscosity of the epoxy resin used and to add flexibility and resiliency to the epoxy composition after hardening. An epichlorohydrin/bisphenol A condensation epoxy resin which has been modified with an aromatic solvent is commercially available from the Halliburton Energy Services under the trade designation "EPSEAL RE®".

When an epoxide containing liquid or mixture of such liquids is included in an epoxy composition of this invention to modify the viscosity of an epoxy resin therein, the epoxide containing liquid or mixture is generally present in an amount in the range of from about 20% to about 50% by weight of the epoxy composition, preferably in an amount of about 27%. An epoxide containing liquid or a mixture of such liquids can also be utilized as the only epoxide source in an epoxy composition of this invention.

While various epoxide containing liquids can be used, preferred such liquids are the diglycidyl ether of 1,4-butanediol, the diglycidyl ether of neopentyl glycol and the diglycidol ether of cyclohexanedimethanol. A suitable epoxide containing liquid comprised of the diglycidyl ether of 1,4-butanediol is commercially available from the Shell Chemical Company under the trade name "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentylglycol is commercially available from Shell Chemical Company under the trade name "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexanedimethanol is commercially available from Shell Chemical Company under the trade name "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid.

When an epoxide containing liquid or mixture is utilized as the only epoxide source in an epoxy composition of this invention, the epoxide containing liquid or mixture is generally present in an amount in the range of from about 20% to about 80% by weight of the epoxy composition, preferably in an amount of about 50%.

The organosilane compound functions in the epoxy compositions of this invention to impart high metal pipe surface and formation surface bond strengths to the compositions. The organosilane compound undergoes hydrolysis in the presence of trace quantities of water whereby trialkoxysilanols are formed which dehydrate and form strong bonds to pipe and formation surfaces. That is, the dehydration results in the formation of bonds with silica in the formation and iron oxide on the pipe.

Suitable organosilane compounds include 3-aminopropyltrimethyoxysilane, 3-aminopropyltriethoxysilane, N-2-(aminoethyl)-3-ammopropyltriethoxysilane and 3-glycidoxy-propyltrimethoxysilane. Of these, 3-glycidoxypropyltrimethoxysilane is preferred. The organosilane compound is included in an epoxy composition of this invention in an amount in the range of from about 0.1% to about 5% by weight of the epoxy composition, preferably in an amount of about 0.5%.

A variety of hardening agents including, but not limited to, aliphatic amines, amide amines, amido amines, imidazoles, aliphatic tertiary amines, aromatic amines, cycloaliphatic amines, heterocyclic amines, polyamides, polyethylamines and carboxylic acid anhydrides can be utilized in the compositions of this invention containing the above described epoxy resins and/or epoxide containing liquids. Of these, aliphatic amines, aromatic amines and carboxylic acid anhydrides are the most suitable.

Examples of aliphatic and aromatic amine hardening agents are triethylenetetraamine, ethylenediamine, N-cocoalkyltri-methylenediamine, isophoronediamine, diethyltoluenediamine, and tris (dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltri-methylenediamine, isophoronediamine, diethyltoluenediamine and tris(dimethylaminomethylphenol) are preferred, with isophoronediamine, diethyletoluenediamine and tris (dimethylaminomethylphenol) being the most preferred. The hardening agent or agents utilized are included in the epoxy compositions of the present invention in an amount in the range of from about 20% to about 50% by weight of the compositions.

As mentioned above, the epoxy compositions preferably also include a particulate filler such as crystalline silicas, amorphous silicas, clays, calcium carbonate or barite. When such a filler is utilized, it is added to an epoxy composition of this invention in an amount in the range of from about 100% to about 300% by weight of the composition.

A preferred method of this invention for sealing a string of pipe in a well bore comprises the following steps. A hardenable epoxy sealing composition of this invention is prepared which hardens into a resilient solid mass having high bond strength. The epoxy composition is basically comprised of an epoxy resin or an epoxide containing liquid, or both, of the types described above, an organosilane compound of the type described above and at least one hardening agent of the type described above. After the epoxy composition has been prepared, it is placed in the annulus between a string of pipe and the walls of a well bore and the epoxy composition is allowed to harden therein. The epoxy composition also preferably includes a particulate filler of the type described above.

In order to further illustrate the methods and epoxy compositions of this invention, the following examples are given.

EXAMPLE 1

An epoxide containing liquid comprised of diglycidyl ether of cyclohexane dimethanol and an epoxy resin comprised of the condensation product of epichlorohydrin and bisphenol A mixed with an aromatic solvent were tested individually and in 50% mixtures with each other. The epoxides were mixed with an organosilane, i.e., N-2-(aminoethyl)-3-aminopropyltrimeth-oxysilane and a hardening agent comprised of 2-ethyl-4-methyl-imidazole or a mixture of diethyltoluenediamine and tris (dimethylaminoethylphenol). Microsand (powdered crystalline silica) was added to the mixtures, and the mixtures were tested for shear bond strength. Additional identical mixtures were prepared without the organosilane compound, and they were also tested for shear bond strength.

The apparatus used to determine the shear bond strength included a standard ASTM 2"×2"×2" cube mold with a plastic liner and a metal plate to which the epoxide mixtures tested bonded to. A plastic liner was used to prevent the epoxide mixtures from bonding to the sides and bottom of the mold. The metal plate was 2" wide×3" high×0.5" thick with smooth surfaced ends at the top and bottom of the 3" height. The surfaced bottom served as a means to obtain a vertical positioning of the metal plate in the mold during pouring and curing of the epoxy mixture and the surfaced top was used for applying even loading to the plate. The other surfaces of the plate were sand blasted. The plate was placed in the center of the plastic mold and the epoxide mixtures tested were poured on both sides of the plate.

Each epoxide mixture tested was cured in the mold for 72 hours at 140° F. Thereafter, the bonding plate with the cured epoxy mixture bonded thereto was placed in a support apparatus whereby the bottom and sides of the cured epoxy mixture were supported but the area immediately below the bonding plate was not. The support system was then placed between the loading platens of a load press, and a load was applied to the bottom of the support system and the top of the bonding plate. The load (in psi.) at which the bond between the plate surfaces and the epoxide mixture failed, i.e., the shear bond strength was noted.

The quantities of the various components of each epoxide mixture tested and the shear bond strengths determined are set forth in Table I below.

From Table I it can be seen that the presence of the organosilane compound in the epoxide mixtures substantially increased the shear bond strengths of the mixtures.

EXAMPLE 2

Additional epoxide mixtures of the type described above were prepared except that the hardening agent utilized was a mixture of diethyltoluenediamine and tris (dimethylaminoethyl-phenol). Also, two different organosilane compounds were utilized which were compared to each other and to identical epoxy mixtures without a silane compound. The results of these tests are set forth in Table II below.

TABLE I

SHEAR BOND STRENGTH TESTS

Quantities of Components,
% by weight of Epoxide Liquid, Epoxy Resin or mixtures thereof.

| Sample No. | Epoxide[1] Liquid | Epoxy[2] Resin Diluted with Aromatic Solvent | First[3] Hardening Agent | Second[4] Hardening Agent | Third[5] Hardening Agent | Micro[6] Sand | Organo[7]- Silane Compound | Shear Bond Strength, psi |
|---|---|---|---|---|---|---|---|---|
| 1 | None | 100 | 3 | None | None | 150 | 0.05 | 185 |
| 2 | 50 | 50 | 3 | None | None | 150 | 0.05 | 460 |
| 3 | 100 | None | None | 28 | 0.3 | 150 | 0.475 | 3020 |
| 4 | None | 100 | 3 | None | None | 150 | None | 81 |
| 5 | 50 | 50 | 3 | None | None | 150 | None | 171 |
| 6 | 100 | None | None | 28 | 0.3 | 150 | None | 258 |

[1]Diglycidyl ether of cyclohexane dimethanol - "HELOXY ® 107" from Shell Chemical Co.
[2]Epichlorohydrin and bisphenol A resin ("EPON ® RESIN 828") diluted with aromatic solvent - "EPSEAL ® RE" from Halliburton Energy Services
[3]2-ethyl-4-methyl imidazole
[4]Diethyltoluenediamine
[5]Tris(dimethylaminoethylphenol)
[6]Powdered crystalline silica
[7]N-2-(aminoethyl)-3-aminopropyltrimethoxysilane

TABLE II

COMPRESSIVE STRENGTH AND SHEAR BOND STRENGTH TESTS

Quantities of Components,
% by Weight of Epoxide Liquid, Epoxy Resin or Mixture Thereof.

| Sample No. | Epoxide[1] Liquid | Epoxy[2] Resin Diluted With Aromatic Solvent | First[3] Hardening Agent | Second[4] Hardening Agent | Micro[5] Sand | First[6] Organo- Silane Compound | Second[7] Organo- Silane Compound | Compressive Strength, psi | Shear Bond Strength, psi |
|---|---|---|---|---|---|---|---|---|---|
| 1 | 100 | None | 28 | 2.5 | 150 | 0.5 | None | 20,900 | 1294 |
| 2 | 80 | 20 | 28 | 2.5 | 150 | 0.5 | None | 18,780 | 628 |
| 3 | 60 | 40 | 28 | 2.5 | 150 | 0.5 | None | 14,410 | 288 |
| 4 | 100 | None | 28 | 2.5 | 150 | 1 | None | 22,900 | 1315 |
| 5 | 80 | 20 | 28 | 2.5 | 150 | 1 | None | 21,900 | 583 |
| 6 | 60 | 40 | 28 | 2.5 | 150 | 1 | None | 17,280 | 476 |
| 7 | 100 | None | 28 | 2.5 | 150 | None | 0.5 | 22,400 | 963 |
| 8 | 80 | 20 | 28 | 2.5 | 150 | None | 0.5 | 20,100 | 538 |
| 9 | 60 | 40 | 28 | 2.5 | 150 | None | 0.5 | 15,770 | 362 |

TABLE II-continued

COMPRESSIVE STRENGTH AND SHEAR BOND STRENGTH TESTS

Quantities of Components,
% by Weight of Epoxide Liquid, Epoxy Resin or Mixture Thereof.

| Sample No. | Epoxide[1] Liquid | Epoxy[2] Resin Diluted With Aromatic Solvent | First[3] Hardening Agent | Second[4] Hardening Agent | Micro[5] Sand | First[6] Organo-Silane Compound | Second[7] Organo-Silane Compound | Compressive Strength, psi | Shear Bond Strength, psi |
|---|---|---|---|---|---|---|---|---|---|
| 10 | 100 | None | 28 | 2.5 | 150 | None | None | 17,620 | 759 |
| 11 | 80 | 20 | 28 | 2.5 | 150 | None | None | 16,940 | 566 |
| 12 | 60 | 40 | 28 | 2.5 | 150 | None | None | 14,450 | 408 |

[1] Diglycidyl ether of cyclohexane dimethanol - "HELOXY ® 107" from Shell Chemical Co.
[2] Epichlorohydrin and bisphenol A resin ("EPON ® RESIN 828") diluted with aromatic solvent - "EPSEAL ® RE" from Halliburton Energy Services
[3] Diethyltoluenediamine.
[4] Tris(dimethylaminoethylphenol).
[5] Powdered crystalline silica.
[6] 3-glycidoxypropyltrimethoxysilane.
[7] 3-aminopropyltrimethoxysilane.

From Table II it can be seen that the presence of an organosilane compound in the epoxide mixtures substantially increased both the compressive strengths and shear bond strengths of the hardened mixtures.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. An improved method of sealing pipe in a well bore comprising the steps of:
   (a) preparing a hardenable epoxy sealing composition which hardens into a resilient solid mass having high bond strength comprising an epoxide containing liquid, an organosilane compound and a hardening agent;
   (b) placing said epoxy composition into the annulus between said pipe and the walls of said well bore; and
   (c) allowing said epoxy composition to harden.

2. The method of claim 1 wherein said epoxide containing liquid is selected from the group of the diglycidyl ether of neopentyl glycol, the diglycidyl ether of cyclohexanedimethanol and mixtures of such liquids and is present in said composition in an amount in the range of from about 20% to about 80% by weight thereof.

3. The method of claim 1 wherein said organosilane compound is selected from the group of 3-aminopropyltrimethoxysilane, 3-aminopropyltriethoxysilane, N-2-(aminoethyl)-3-aminopropyltriethoxysilane and 3-glycidoxypropyltrimethoxysilane and is present in said composition in an amount in the range of from about 0.1% to about 5% by weight thereof.

4. The method of claim 1 wherein said hardening agent is at least one member selected from the group of aliphatic amines, aromatic amines, amide amines, amido amines, imidazoles and carboxylic acid anhydrides and is present in said composition in an amount in the range of from about 20% to about 50% by weight thereof.

5. The method of claim 1 wherein said hardening agent is at least one member selected from the group of triethylene-tetraamine, ethylenediamine, N-cocoalykyltrimethylenediamine, isophoronediamine, diethyltoluenediamine and tris(dimethylaminomethylphenol) and is present in said composition in an amount in the range of from about 20% to about 50% by weight thereof.

6. The method of claim 1 wherein said epoxy composition further comprises a particulate filler.

7. The method of claim 6 wherein said particulate filler is selected from the group consisting of crystalline silicas, amorphous silicas, clays, calcium carbonate and barite and is added to said composition in an amount in the range of from about 100% to about 300% by weight thereof.

8. An improved method of sealing pipe in a well bore whereby the sealant can withstand the effects of contact with corrosive fluids and pipe movements comprising the steps of:
   (a) preparing a hardenable epoxy sealing composition which hardens into a resilient solid mass having high bond strength comprising an epoxy resin, an organosilane compound and a hardening agent;
   (b) placing said epoxy composition into the annulus between said pipe and the walls of said well bore; and
   (c) allowing said epoxy composition to harden.

9. The method of claim 8 wherein said epoxy resin is selected from the group of the condensation products of epichlorohydrin and bisphenol A and is present in said composition in an amount in the range of from about 20% to about 50% by weight thereof.

10. The method of claim 8 wherein said organosilane compound is selected from the group of 3-aminopropyltrimeth-oxysilane, 3-aminopropyltriethoxysilane, N-2-(aminoethyl)-3-aminopropyltriethoxysilane and 3-glycidoxypropyltrimethoxy-silane and is present in said composition in an amount in the range of from about 0.1% to about 5% by weight thereof.

11. The method of claim 8 wherein said hardening agent is at least one member selected from the group of aliphatic amines, aromatic amines, amide amines, amido amines, imidazoles and carboxylic acid anhydrides and is present in said composition in an amount in the range of from about 20% to about 50% by weight thereof.

12. The method of claim 8 wherein said hardening agent is at least one member selected from the group of triethylene-tetraamine, ethylenediamine, N-cocoalykyltrimethylenediamine, isophoronediamine, diethyltoluenediamine and tris(dimethylaminomethylphenol) and is present in said composition in an amount in the range of from about 20% to about 50% by weight thereof.

13. The method of claim 8 wherein said epoxy composition further comprises an epoxide containing liquid selected from the group of the diglycidyl ether of 1,4-butanediol, the diglycidyl ether of neopentyl glycol and the diglycidyl ether of cyclohexanedimethanol and mixtures of such liquids and is present in said composition in an amount in the range of from about 20% to about 80% by weight thereof.

14. The method of claim 8 wherein said composition further comprises a particulate filler.

15. The method of claim 14 wherein said filler is selected from the group consisting of crystalline silicas, amorphous silicas, clays, calcium carbonate and barite and is added to said composition in an amount in the range of from about 100% to about 300% by weight thereof.

16. An improved composition for sealing pipe in a well bore which hardens into a resilient solid mass having high bond strength comprising:

an epoxide containing liquid or mixture of such liquids present in said composition in an amount in the range of from about 20% to about 80% by weight thereof;

an organosilane compound present in said composition in an amount in the range of from about 0.1% to about 5% by weight thereof; and a hardening agent present in said composition in an amount in the range of from about 20% to about 50% by weight thereof.

17. The method of claim 16 wherein said epoxide containing liquid is selected from the group of the diglycidyl ether of 1,4-butanediol, the diglycidyl ether of neopentyl glycol, the diglycidyl ether of cyclohexanedimethanol and mixtures of such liquids.

18. The method of claim 16 wherein said organosilane compound is selected from the group of 3-aminopropyltrimethoxysilane, 3-aininopropyltriethoxysilane, N-2-(aminoethyl)-3-aminopropyltriethoxysilane and 3-glycidoxypropyltrimeth-oxysilane.

19. The method of claim 16 wherein said hardening agent is at least one member selected from the group of aliphatic amines, aromatic amines, amide amines, amido amines, imidazoles and carboxylic acid anhydrides.

20. The method of claim 16 wherein said hardening agent is at least one member selected from the group of triethylene-tetraamine, ethylenediamine, N-cocoalykyltrimethylenediamine, isophoronediamine, diethyltoluenediamine and tris(dimethyl-aminomethylphenol).

21. The method of claim 16 wherein said epoxy composition further comprises a particulate filler.

22. The method of claim 21 wherein said particulate filler is selected from the group consisting of crystalline silicas, amorphous silicas, clays, calcium carbonate and barite and is added to said composition in an amount in the range of from about 100% to about 300% by weight thereof.

23. The method of claim 16 wherein said epoxy composition further comprises an epoxy resin selected from the group of the condensation products of epichlorohydrin and bisphenol A and is present in said composition in an amount in the range of from about 20% to about 50% by weight thereof.

* * * * *